(No Model.)

2 Sheets—Sheet 1.

N. H. HARRIS.
PLOW.

No. 455,830. Patented July 14, 1891.

Witnesses
Geo. E. Frech.
Wm. Bagger

Inventor
Nelson H. Harris
By his Attorneys,
C. A. Snow & Co.

(No Model.) 2 Sheets—Sheet 2.

N. H. HARRIS.
PLOW.

No. 455,830. Patented July 14, 1891.

Witnesses
Geo. E. Frech.
Wm. Bagger

Inventor
Nelson H. Harris

By his Attorneys,
C. A. Snow & Co.

UNITED STATES PATENT OFFICE.

NELSON H. HARRIS, OF VINITA, INDIAN TERRITORY.

PLOW.

SPECIFICATION forming part of Letters Patent No. 455,830, dated July 14, 1891.

Application filed January 15, 1891. Serial No. 377,916. (No model.)

*To all whom it may concern:*

Be it known that I, NELSON H. HARRIS, a citizen of the United States, residing at Vinita, in the Cherokee Nation and Indian Territory, have invented a new and useful Plow, of which the following is a specification.

This invention relates to devices for breaking and cultivating the soil, and it is in the nature of a plow provided with an attachment for breaking and disintegrating the clods.

The invention consists in the improved construction, arrangement, and combination of parts, which will be hereinafter fully described, and particularly pointed out in the claims.

Figure 1:
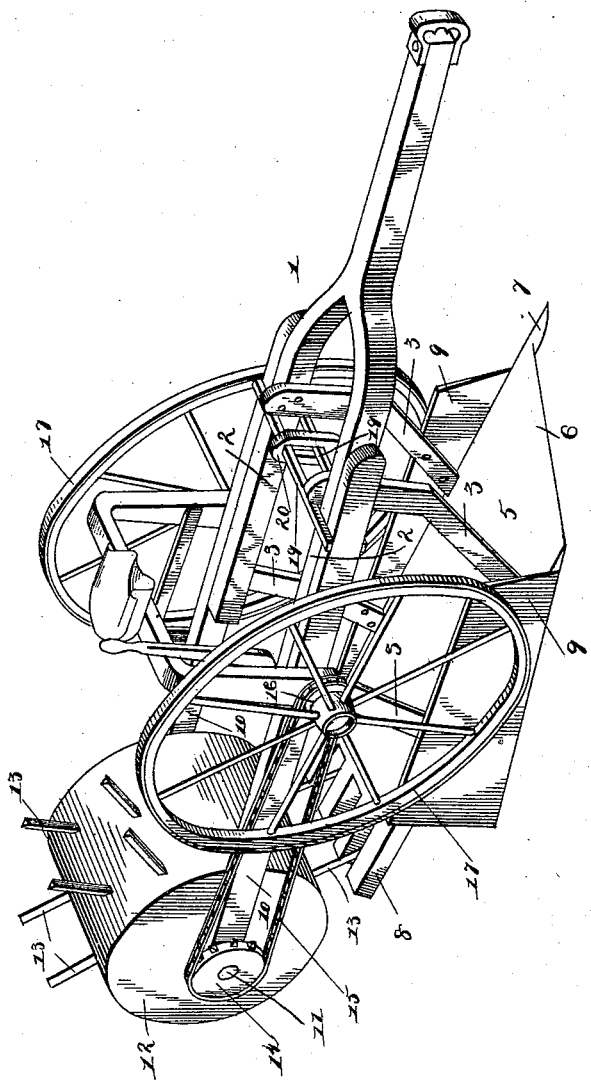
Figure 2:
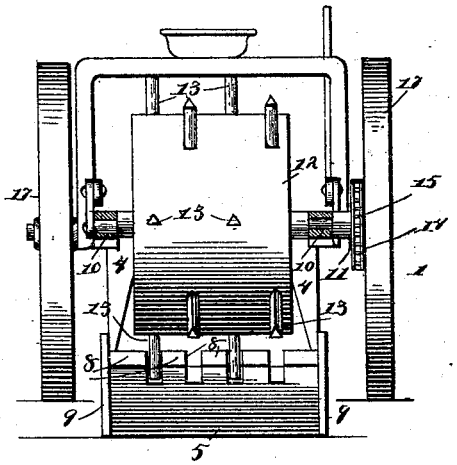
Figure 3:
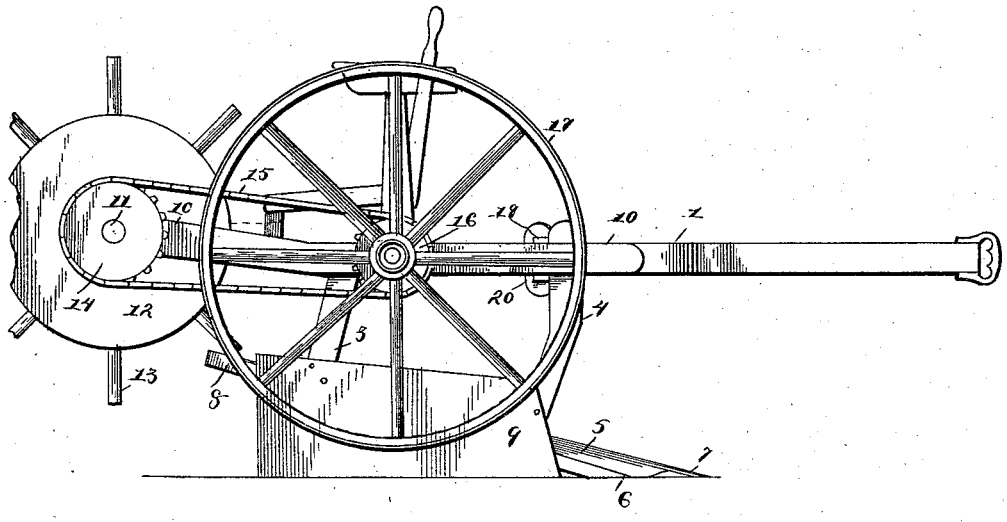

In the drawings hereto annexed, Figure 1 is a perspective view of a plow constructed in accordance with my invention. Fig. 2 is a transverse sectional view. Fig. 3 is a side elevation.

Like numerals of reference indicate like parts in all the figures.

1 designates the frame, which is bifurcated at its rear end, so as to form the arms 2 2, which are provided with downwardly-extending standards 3 and 4, to the lower ends of which the plow is attached. The said plow is composed of the mold-board 5, the front end of which has the beveled share 6, terminating in the point 7. The mold-board or body of the plow is inclined upwardly and rearwardly, slanting to one side, and is provided at its rear edge with rearwardly-projecting fingers 8. Each side of the plow is also provided with a vertically-arranged cutter or landside 9.

To the outer sides of the arms 2 of the frame are pivoted the brackets 10, the rear ends of which are provided with bearings for a transverse shaft 11, upon which is mounted a wheel or disk 12, having radially-extending teeth or sprockets 13, which are adapted to fit between the rearwardly-extending fingers 8 of the plow. The shaft 11 is provided at one end with a sprocket-wheel 14, which is connected by a chain 15 with a sprocket-wheel 16 upon one of the transporting-wheels 17, which are journaled upon the spindles of an arched axle 18, which is suitably connected with the frame. A suitable seat may be provided for the driver. A pair of springs 19, which are connected by a link 20, are arranged above and below the front ends of the pivoted brackets 10 and the arms 2 of the frame. The said springs serve to retain the pivoted brackets, carrying the shaft 11 and wheel 12 in operative position.

The operation and advantages of my invention will be readily understood from the foregoing description, taken in connection with the drawings hereto annexed. When the machine progresses over the field, the plow will lift a slice of sod, which will pass in an upward and rearward direction over the mold-board and be finely pulverized and disintegrated by the action of the revolving wheel or disk having the sprockets engaging the rearwardly-extending fingers of the mold-board. The machine will thus by a single operation perform the work of both a plow and a harrow and in a more thorough and effective manner than would be possible by the use of separate machines.

I have in the foregoing described what I consider to be the preferred construction of my invention; but I desire it to be understood that I reserve the right to any changes and modifications which may be resorted to without departing from the spirit of my invention.

Having thus described my invention, I claim and desire to secure by Letters Patent of the United States—

1. The combination, with a plow having fingers extending rearwardly from the mold-board thereof, of the arms pivoted to the frame, springs supporting the front ends of said arms and permitting the same to vibrate upon their pivots, and a toothed cylinder mounted upon a shaft journaled at the rear ends of said arms, substantially as set forth.

2. The combination of the plow having rearwardly-extending fingers, the arms or levers pivoted to the side bars of the frame, a pair of springs arranged above and below said arms and side bars, a link connecting said springs, and a toothed cylinder mounted upon a shaft journaled in the pivoted arms, substantially as and for the purpose set forth.

3. In a plow, the combination of the mold-board having rearwardly-extending fingers, the vertical parallel landsides, and a wheel or disk having radial teeth or sprockets engaging the rearwardly-extending fingers of the mold-board, substantially as and for the purpose set forth.

4. In a plow, the combination of the frame, the pivoted brackets, the springs supporting the front ends of said brackets, the shaft journaled at the rear ends of the latter, a wheel or disk mounted upon said shaft and having radially-extending teeth or sprockets, and the mold-board having the rearwardly-extending fingers, substantially as and for the purpose set forth.

5. In a plow, the combination of the frame having arms extending rearwardly, the standards secured to said arms and carrying the upwardly and rearwardly inclined mold-board provided with rearwardly-extending fingers, the vertical parallel landsides, the pivoted spring-supported arms, a shaft journaled in the latter and carrying a wheel or disk provided with radial teeth or sprockets engaging the rearwardly-extending fingers of the mold-board, the transporting-wheels, and means for transmitting motion from one of the latter to the shaft carrying the toothed wheel or disk, substantially as and for the purpose set forth.

In testimony that I claim the foregoing as my own I have hereto affixed my signature in presence of two witnesses.

NELSON H. HARRIS.

Witnesses:
  JOSEPH I. CUNY,
  ALF. MEGLEE.